United States Patent
Roth-Mandutz et al.

(10) Patent No.: US 11,979,856 B2
(45) Date of Patent: May 7, 2024

(54) ENHANCED QUALITY OF SERVICE FOR V2X

(71) Applicant: Fraunhofer-Gesellschaft zur Förderung der angewandten Forschung e.V., Munich (DE)

(72) Inventors: Elke Roth-Mandutz, Erlangen (DE); Khaled Shawky Hassan Hussein, Erlangen (DE); Shubhangi Bhadauria, Erlangen (DE); Martin Leyh, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/009,614

(22) Filed: Sep. 1, 2020

(65) Prior Publication Data

US 2020/0404625 A1 Dec. 24, 2020

Related U.S. Application Data

(63) Continuation of application No. PCT/EP2019/057920, filed on Mar. 28, 2019.

(30) Foreign Application Priority Data

Mar. 29, 2018 (EP) ..................... 18165235

(51) Int. Cl.
*H04W 72/02* (2009.01)
*H04W 4/40* (2018.01)
(Continued)

(52) U.S. Cl.
CPC ............ *H04W 72/02* (2013.01); *H04W 4/40* (2018.02); *H04W 4/70* (2018.02); *H04W 92/18* (2013.01)

(58) Field of Classification Search
CPC .......... H04W 72/02; H04W 4/70; H04W 4/40
(Continued)

(56) References Cited

U.S. PATENT DOCUMENTS

2013/0322275 A1 12/2013 Comeau et al.
2017/0006594 A1 1/2017 Wei
(Continued)

FOREIGN PATENT DOCUMENTS

CN 1809029 A 7/2006
CN 103024911 A 4/2013
(Continued)

OTHER PUBLICATIONS

3GPP TS 38.885 Study on NR Vehicle-to-Everything (V2X), V2.0.0, 2019.
(Continued)

*Primary Examiner* — Mark G. Pannell
(74) *Attorney, Agent, or Firm* — Perkins Coie LLP; Michael A. Glenn

(57) ABSTRACT

Embodiments provide a transceiver for a wireless communication system, wherein the transceiver is configured to communicate with at least one other transceiver of the wireless communication system using sidelink resource pools [e.g., mode 3 resource pool, mode 4 resource pool, shared resource pool, unshared resource pool or exceptional resource pool] of the wireless communication system, wherein the transceiver is configured to transmit a data packet on one of the sidelink resource pools of the wireless communication system to the other transceiver of the wireless communication system, wherein the transceiver is configured to, if a PPPR value associated with the data packet or with data contained in the data packet indicates a high reliability [of the data packet], to re-transmit the data packet at least on once on another sidelink resource pool of the
(Continued)

sidelink resource pools of the wireless communication system.

19 Claims, 11 Drawing Sheets

(51) Int. Cl.
　　*H04W 4/70*　　　(2018.01)
　　*H04W 92/18*　　　(2009.01)
(58) Field of Classification Search
　　USPC .......................................................... 370/329
　　See application file for complete search history.

(56) References Cited

U.S. PATENT DOCUMENTS

| | | | |
|---|---|---|---|
| 2017/0126306 | A1 | 5/2017 | Kim et al. |
| 2018/0049084 | A1 | 2/2018 | Lee et al. |
| 2018/0199194 | A1 | 7/2018 | Xu et al. |
| 2018/0234947 | A1 | 8/2018 | Wu et al. |
| 2018/0234973 | A1* | 8/2018 | Lee ........................ H04W 88/04 |
| 2019/0124015 | A1* | 4/2019 | Loehr ................... H04L 69/321 |
| 2019/0230645 | A1* | 7/2019 | Cheng ................... H04W 12/08 |
| 2019/0313359 | A1* | 10/2019 | Lee .......................... H04W 4/70 |
| 2019/0394786 | A1* | 12/2019 | Parron ................ H04L 27/0006 |
| 2020/0213045 | A1* | 7/2020 | Lee ......................... H04L 45/74 |
| 2020/0275303 | A1* | 8/2020 | Mok ..................... H04L 1/0017 |
| 2020/0367093 | A1* | 11/2020 | Belleschi .......... H04W 28/0278 |

FOREIGN PATENT DOCUMENTS

| | | |
|---|---|---|
| CN | 106413097 A | 2/2017 |
| CN | 106576354 A | 4/2017 |
| CN | 107852605 A | 3/2018 |
| EP | 3273634 A1 | 1/2018 |
| WO | 2016045094 A1 | 3/2016 |

OTHER PUBLICATIONS

"3GPP TR 23786_2018-03", 3rd Generation Partnership Project; Technical Specification Group Services and System Aspects; Study on architecture enhancements for EPS and 5G System to support advanced V2X services (Release 16), Mar. 2018.
"3GPP TS 23285_2018-06", 3rd Generation Partnership Project; Technical Specification Group Services and System Aspects; Architecture enhancements for V2X services (Release 15), Jun. 2018.
"3GPP TS 23287_2020-09", 3rd Generation Partnership Project; Technical Specification Group Services and System Aspects; Architecture enhancements for 5G System (5GS) to support Vehicle-to-Everything (V2X) services (Release 16), Sep. 2020.
"3GPP TS 23501_2020-09", 3rd Generation Partnership Project; Technical Specification Group Services and System Aspects; System architecture for the 5G System (5GS); Stage 2 (Release 16), Sep. 2020.
"3GPP TS 36.211 V14.3.0", 3rd Generation Partnership Project; Technical Specification Group Radio Access Network; Evolved Universal Terrestrial Radio Access (E-UTRA); Physical channels and modulation (Release 14), Jun. 2017.
"3GPP TS 36.211-e30_s00-s05", Release 14, Jun. 2017.
"3GPP TS 36.321 V14.3.0", 3rd Generation Partnership Project; Technical Specification Group Radio Access Network; Evolved Universal Terrestrial Radio Access (E-UTRA); Medium Access Control (MAC) protocol specification (Release 14), 2019.
"3GPP TS 36211-e30 s06-s08", Release 14, Jun. 2017.
"3GPP TS 36211-e30_s09-sxx", Jun. 2017.
"3GPP TS 36212_2017-06", 3rd Generation Partnership Project; Technical Specification Group Radio Access Network; Evolved Universal Terrestrial Radio Access (E-UTRA); Multiplexing and channel coding (Release 14), Jun. 2017.
"3GPP TS 36213-e50_cover", 3rd Generation Partnership Project; Technical Specification Group Radio Access Network; Evolved Universal Terrestrial Radio Access (E-UTRA); Physical layer procedures (Release 14), Dec. 2017.
"3GPP TS 36213-e50_s00-s05", Release 14, Dec. 2017.
"3GPP TS 36213-e50_s06-s09", Release 14, Dec. 2017.
"3GPP TS 36213-e50_s10-s13", Dec. 2017.
"3GPP TS 36213-e50_s14-xx", Release 14, Dec. 2017.
"3GPP TS 36213-e50_sAnnexes", Release 14, Annex A (informative) Change History, Dec. 2017.
"3GPP TS 36300_2018-09", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018.
"3GPP TS 36321_2018-09", 3rd Generation Partnership Project; Technical Specification Group Radio Access Network; Evolved Universal Terrestrial Radio Access (E-UTRA); Medium Access Control (MAC) protocol specification (Release 15), Sep. 2018.
"3GPP TS 36321_2017-06", 3rd Generation Partnership Project; Technical Specification Group Radio Access Network; Evolved Universal Terrestrial Radio Access (E-UTRA); Medium Access Control (MAC) protocol specification (Release 14), Jun. 2017.
"3GPP TS 36323_2018-09", 3rd Generation Partnership Project; Technical Specification Group Radio Access Network; Evolved Universal Terrestrial Radio Access (E-UTRA); Packet Data Convergence Protocol (PDCP) specification (Release 15), Sep. 2018.
"3GPP TS 36331_2016-09", 3rd Generation Partnership Project; Technical Specification Group Radio Access Network; Evolved Universal Terrestrial Radio Access (E-UTRA); Radio Resource Control (RRC); Protocol specification (Release 14), Sep. 2016.
"Ericson Tdoc R2-1804853", [LTE/5GC] Email discussion report on RAN slicing, Apr. 2018.
"Ericsson TDoc draft R2-18xxxx", draft Report from [101#72][LTE/V2X] Packet Duplication, Apr. 2018.
"Ericsson: "Packet duplication for PC5"", 3GPP Draft; R2-1803525—Packet Duplication for PC5, 3rd Generation Partnership Project (3GPP), Mobile Competence Centre; 650, Route Des Lucioles; F-06921 Sophia-Antipolis Cedex; France, Mar. 2018.
"Motorola Mobility et al.: "Solution for Key Issue #4: Re-use PPPP mechanism for enhanced V2X"", 3GPP Draft; S2-182161_5G_QOS_SUPPORT, 3rd Generation Partnership Project (3GPP), Mobile Competence Centre; 650, Route Des Lucioles; F-06921 Sophia-Antipolis Cedex; France, Mar. 2018.
"Nokia R2-1803350_2018", Further thoughts on the UE request for duplication activation, Mar. 2018.
"Nokia R2-1803351", On the co-existence of Rel-14 and Rel-15 V-UEs, Mar. 2018.
"RAN 2 Chairman (Intel) Proposed Agenda", 3GPP TSG-RAN WG2 Meetign #101; Mar. 2018, Mar. 2018.
NEC, Load balancing via dynamic resource sharing for multiple carriers and pools, 3GPP TSG RAN WG1 #87 R1-1611722, Nov. 4, 2016.
Nokia, Nokia Shanghai Bell, On the PPPR for V2X packet duplication via multiple PC5 carriers, 3GPP TSG RAN WG2 #101 R2-1803352, Feb. 16, 2018.
Qualcomm Incorporated, CATT, Carrier Aggregation Use Cases in V2X Phase 2, 3GPP TSG RAN WG2 #99bis R2-1710685, Sep. 29, 2017.
Motorola Mobility, Lenovo; Title: Solution for Key Issue #4: Re-use PPPP mechanism for enhanced V2X; SA WG2 Meeting #126; S2-182161; Feb. 26-Mar. 2, 2018, Montreal, Canada (5 pages).

* cited by examiner

ENHANCED QUALITY OF SERVICE FOR V2X

CROSS-REFERENCE TO RELATED APPLICATIONS

This application is a continuation of copending International Application No. PCT/EP2019/057920, filed Mar. 28, 2019, which is incorporated herein by reference in its entirety, and additionally claims priority from European Application No. 18165235.5, filed Mar. 29, 2018, which is also incorporated herein by reference in its entirety.

BACKGROUND OF THE INVENTION

The present invention relates to the field of wireless communication networks, and more specifically, to concepts for transmitting data for ultra-reliable low latency communications (URLLC). Some embodiments relate to an enhanced quality of service for V2X.

FIG. 1 is a schematic representation of an example of a wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station (BS) refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Users, such as mobile devices (e.g., vehicles comprising UEs), may further communicate directly with each other in both, coverage mode (e.g., LTE V2X mode 3; respectively D2D mode 1 or NR V2X mode 1) and out-of-coverage mode (e.g., LTE V2X mode 4; respectively D2D mode 2 or NR V2X mode 2) using the PC5 interface (e.g., in case of D2D, LTE V2X/V2V or NR V2X/V2V), as will be discussed later on with respect to FIGS. 3 and 4. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs".

The wireless network or communication system depicted in FIG. 1 may be a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consists of a smaller number of OFDM symbols, e.g. if utilizing shortened transmission time intervals (sTTI) or a mini-slot/non-slot-based frame structure comprising of just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network.

Although FIG. 2 represents only a single macro cell, it is noted that one or more of the other cells in FIG. 1 may also use the overlaid networks. The small cell network comprises a plurality of small cell base stations SeNB$_1$ to SeNB$_5$ each operating within a respective area 120$_1$ to 120$_5$, also referring as the coverage area of the small cell. The small cell base stations SeNB$_1$ to SeNB$_5$ may be controlled by the macro cell base station MeNB$_1$ to which the respective small cell base stations SeNB$_1$ to SeNB$_5$ are connected via respective backhaul links 122$_1$ to 122$_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station MeNB$_1$ as indicated by arrow 124$_1$ and by the small cell base station SeNB$_1$, as indicated schematically by the arrow 124$_2$.

In mobile communication networks, for example in networks like those described above with reference to FIG. 1 and FIG. 2, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, pedestrians or network infrastructure (V2I). Other UEs may not be vehicular related UEs but may comprise any of the above mentioned devices. Such devices may also communicate directly with each other using the sidelink channels (i.e., direct communication, such as D2D or V2X communication, where V2X could be seen as special form of D2D, e.g., D2D with mobility).

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1 or in FIG. 2, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station. In each of the above-mentioned scenarios, the UEs and/or the BS should have knowledge about the resources to be used for the sidelink communication among the UEs.

FIG. 3 shows a schematic representation of a situation in which two UEs directly communicating with each other are both in coverage of a base station. The base station gNB has a coverage area that is schematically represented by the circle 200 which, basically, corresponds to the cell schematically represented in FIG. 1 or FIG. 2. The UEs directly communicating with each other include a first vehicle 202 and a second vehicle 204 both in the coverage area 200 of the base station gNB (this also works for any scenario where the 2 UEs are connected to different gNBs). Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The BS schedules and assigns the resources to be used within a given resource pool for the V2V communication over the sidelink. The UE operates in this mode only when in coverage and in an RRC_CONNECTED state. This configuration is also referred to as a mode 3 configuration (e.g., for LTE V2X, for D2D this is referred to as mode 1). For NR V2X (from release 16 onwards) this is referred to as mode 1.

FIG. 4 shows a scenario in which the UEs are out of coverage of a BS, i.e., the respective UEs directly communicating with each other may or may not be connected to a base station (i.e. they also may be physically within the coverage of a cell of a wireless communication network and could even be in either RRC_CONNECTED or RRC_IDLE state). Three vehicles 206, 208 and 210 are shown directly communicating with each other over a sidelink, e.g., using the PC5 interfaces. The scheduling and/or interference management of the V2V traffic is based on algorithms implemented in the UEs and/or (partially) pre-configured by the network. This configuration is also referred to as a mode 4 configuration (e.g., for LTE V2X). For D2D this is referred to as mode 2. For NR V2X this is referred to as mode 2.

As mentioned above, the scenario in FIG. 4 which is an out-of-coverage scenario does not mean that the respective mode 4 UEs (e.g., for LTE V2X; respectively mode 2 for D2D or NR V2X) have to be outside of the coverage of a base station, rather, it means that the respective mode 4 UEs are not served by a base station or are not connected to the base station of the coverage area. Thus, there may be situations in which, within the coverage area 200 shown in FIG. 3, in addition to the mode 3 UEs 202, 204 (e.g., for LTE V2X; respectively mode 1 for D2D or NR V2X) also mode 4 UEs 206, 208, 210 (e.g., for LTE V2X; respectively mode 2 for D2D or NR V2X) are present. Since the mode 4 UEs 206-210 schedule their resources autonomously and are not connected to the network, the base station is not aware of resources used by the mode 4 UEs 206-210 for the sidelink communication and, likewise, the mode 4 UEs 206-210 are not aware of resources scheduled by the base station gNB to the mode 3 UEs 202, 204 for a sidelink communication. Thus, resource collisions among the UEs in the respective modes and among mode 4 UEs may occur.

In wireless communication networks as described above with reference to FIG. 1 to FIG. 4, the current (e.g., LTE) V2X specification of 3GPP supports 2 modes:
  Mode 3: resource provisioning via eNB. A UE is connected to an eNB supporting V2X operation and obtains its resources from the eNB
  Mode 4: autonomous mode/distributed scheduling. A UE is used to detect suitable resources by itself. Currently a one-second sensing operation is needed prior to using any resources for transmission.

In wireless communication networks, the sidelink specification of 3GPP for ProSe or D2D (starting from release 12), supports 2 modes:
  Mode 1: resource provisioning via eNB or a gNB. A UE is connected to an eNB or a gNB supporting sidelink configuration and obtains its resources from the eNB or the gNB.
  Mode 2: A UE is used to detect suitable resources by itself.

In wireless communication networks, the NR sidelink V2X specification of 3GPP (starting with release 16) supports 2 modes:

Mode 1: resource provisioning via gNB or eNB. A UE is connected to gNB or eNB supporting sidelink configuration and obtains its resources from any of them.

Mode 2: A UE is used to detect suitable resources by itself. The UE determines, i.e. BS does not schedule, SL transmission resource(s) within SL resources configured by BS/network or pre-configured SL resources [13].

The so-called emergency pool is a special resource pool that can be used for very limited purposes (e.g. during handover) by UEs that have no configured resources for transmission.

Current 3GPP specifications include the priority handling based on the PPPP, which includes advantageous scheduling and selection of PPPP associated resource pools for data transmission.

V2X, V2V, D2D, and sidelinks are described in [1, 3, 4]. Grant-free transmission in the sidelinks (transmission mode 2 for D2D and mode 4 for LTE V2X) is described in [2, 5].

Regarding network slicing, it was agreed (RAN2) that the UE supports currently a maximum of 8 slices in parallel. However, the network may need to support multiple e.g. hundreds of slices [7].

To enhance the reliability, packet duplication is already foreseen in the specification. The scheme how best to implement the packet duplication, especially regarding the new topic resource pool sharing mode 3 (e.g., for LTE V2X; additionally mode 1 for D2D or mode 1 for NR V2X) and mode 4 (e.g., for LTE V2X; additionally mode 2 for D2D or mode 2 NR V2X), is still open.

Therefore, it is the object of the present invention to provide a concept for implementing the packet duplication, especially regarding the new topic resource pool sharing mode 3 and mode 4 for LTE V2X and/or mode 1 and mode 2 for NR V2X and D2D.

SUMMARY

An embodiment may have a transceiver for a wireless communication system, wherein the transceiver is configured to communicate with at least one other transceiver of the wireless communication system using sidelink resource pools of the wireless communication system, wherein the transceiver is configured to transmit a data packet on one of the sidelink resource pools of the wireless communication system to the other transceiver of the wireless communication system, wherein the transceiver is configured to, if a PPPR value associated with said data packet or with data contained in said data packet indicates a high reliability, to re-transmit said data packet at least once on another sidelink resource pool of the sidelink resource pools of the wireless communication system.

Another embodiment may have a transceiver for a wireless communication system, wherein the transceiver is configured to communicate with at least one other transceiver of the wireless communication system, wherein the transceiver is configured to transmit a data packet on a component carrier to the other transceiver of the wireless communication system, wherein the transceiver is configured to, if a PPPR value associated with said data packet or with data contained in said data packet indicates a high reliability, to re-transmit said data packet at least once on at least one other component carrier.

Still another embodiment may have a transceiver for a wireless communication system, wherein the transceiver is configured to communicate with at least one other transceiver of the wireless communication system using sidelink resource pools of the wireless communication system, wherein the transceiver is configured to transmit a data packet on one of the sidelink resource pools of the wireless communication system to the other transceiver of the wireless communication system, wherein the transceiver is configured to, if a PPPR value associated with said data packet or with data contained in said data packet indicates a high reliability, to re-transmit said data packet at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers.

According to another embodiment, a method for transmitting data packets in a wireless communication system between at least two transceivers communicating with each other using sidelink resource pools of the wireless communication system may have the steps of: transmitting a data packet on one of the sidelink resource pools of the wireless communication system to the other transceiver of the wireless communication system; and re-transmitting said data packet at least once on another sidelink resource pool of the sidelink resource pools of the wireless communication system, if a PPPR value associated with said data packet or with data contained in said data packet indicates a high reliability.

According to another embodiment, a method for transmitting data packets in a wireless communication system between at least two transceivers communicating with each other may have the steps of: transmitting a data packet on a component carrier from the transceiver to the other transceiver of the wireless communication system, re-transmitting said data packet at least once on at least one other component carrier, if a PPPR value associated with said data packet or with data contained in said data packet indicates a high reliability.

According to another embodiment, a method for transmitting data packets in a wireless communication system between at least two transceivers communicating with each other using sidelink resource pools of the wireless communication system may have the steps of: transmitting a data packet on one of the sidelink resource pools of the wireless communication system from one transceiver to the other transceiver of the wireless communication system; and re-transmitting said data packet, if a PPPR value associated with said data packet or with data contained in said data packet indicates a high reliability, at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers.

Another embodiment may have a non-transitory digital storage medium having stored thereon a computer program for performing a method for transmitting data packets in a wireless communication system between at least two transceivers communicating with each other using sidelink resource pools of the wireless communication system, the method having the steps of: transmitting a data packet on one of the sidelink resource pools of the wireless communication system to the other transceiver of the wireless communication system; and re-transmitting said data packet at least once on another sidelink resource pool of the sidelink resource pools of the wireless communication system, if a PPPR value associated with said data packet or with data contained in said data packet indicates a high reliability, when said computer program is run by a computer.

Another embodiment may have a non-transitory digital storage medium having stored thereon a computer program for performing a method for transmitting data packets in a wireless communication system between at least two transceivers communicating with each other, the method having the steps of: transmitting a data packet on a component carrier from the transceiver to the other transceiver of the wireless communication system, re-transmitting said data packet at least once on at least one other component carrier, if a PPPR value associated with said data packet or with data contained in said data packet indicates a high reliability, when said computer program is run by a computer.

Still another embodiment may have a non-transitory digital storage medium having stored thereon a computer program for performing a method for transmitting data packets in a wireless communication system between at least two transceivers communicating with each other using sidelink resource pools of the wireless communication system, the method having the steps of: transmitting a data packet on one of the sidelink resource pools of the wireless communication system from one transceiver to the other transceiver of the wireless communication system; and re-transmitting said data packet, if a PPPR value associated with said data packet or with data contained in said data packet indicates a high reliability, at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers, when said computer program is run by a computer.

Embodiments provide a transceiver for a wireless communication system, wherein the transceiver is configured to communicate with at least one other transceiver of the wireless communication system using sidelink resource pools [e.g., mode 3 resource pool, mode 4 resource pool, shared resource pool, unshared resource pool or exceptional resource pool] of the wireless communication system, wherein the transceiver is configured to transmit a data packet on one of the sidelink resource pools of the wireless communication system to the other transceiver of the wireless communication system, wherein the transceiver is configured to, if a PPPR value (PPRR=ProSe per packet reliability) associated with said data packet or with data contained in said data packet indicates a high reliability [of said data packet], to re-transmit said data packet at least on once on another sidelink resource pool of the sidelink resource pools of the wireless communication system.

For example, for NR-V2X, a per-packet priority (similar to PPPP or PPPR as in LTE, e.g. any QoS metric) is being specified at least for non-unicast (e.g., broadcast or groupcast) communication scenarios.

For example, for NR V2X for unicast and possibly groupcast communication a bearer based model is being specified using other QoS metrics, e.g., 5QI, or PQI or VQI or any other QoS flow values [14], [15], [16].

In embodiments, a number of re-transmissions of said data packet depends on the PPPR value.

In embodiments, the transceiver is configured to obtain [e.g., to receive, to determine, or to extract from said data packet] the PPPR value associated with said data packet or with the data contained in said data packet.

In embodiments, the sidelink resource pools of the wireless communication system are at least two out of a mode 3 resource pool, a mode 4 resource pool, a shared resource pool, an unshared resource pool or an exceptional resource pool.

In embodiments, the PPPR value ranges from 1 to 8, wherein a PPPR value of 1 indicates the highest reliability and a PPPR value of 8 indicates the lowest reliability.

In embodiments, the transceiver is configured to retransmit said data packet at least once, if the PPPR value exceeds a predefined threshold.

Thereby, note that, as PPPR value mapping to reliability is upside down, i.e. 1 is highest, 8 is lowest priority, "exceeding the threshold" refers to a PPPR value being equal to or smaller than a predefined PPPR value.

In detail, the priority threshold indicates the upper bound of the PPPP range which is associated with the configurations in cbr-ConfigIndex and in tx-ConfigIndexList. The upper bounds of the PPPR ranges are configured in ascending order for consecutive entries of SL-PPPR-TxConfigIndex in SL-CBR-PPPR-TxConfigList. For the first entry of SL-PPPR-TxConfigIndex, the lower bound of the PPPR range is 1.

In embodiments, the transceiver is configured to retransmit said data packet at least once, if the PPPR value indicates a reliability that is equal to or higher than a predefined reliability For example, for NR-V2X, the transceiver is configured
For per packet based QoS model: to retransmit said data packet at least once
For the bearer based QoS model: to setup a parallel or multiple bearer if the QoS metric e.g. 5QI, PQI, VQI or PPPP or PPPR or any other QoS metric value exceeds a predefined threshold. [TS 23.501], [TR 23.786], [16]

In embodiments, the transceiver is served by a central transceiver, for example, a base station, of the wireless communication system, wherein the transceiver is configured to operate in (e.g., LTE) V2X Mode 3, in which scheduling of resources for the communication with the at least one other transceiver is performed by the central transceiver, wherein the transceiver is configured to transmit the data packet on a (e.g., LTE) V2X mode 3 resource pool of the sidelink resource pools of the wireless communication system, and wherein the transceiver is configured to re-transmit the data packet at least once on a (e.g., LTE) V2X mode 4 resource pool, a shared resource pool, an unshared resource pool or an exceptional resource pool of the sidelink resource pools of the wireless communication system.

In embodiments, the transceiver is served by a central transceiver, for example, a base station, of the wireless communication system, wherein the transceiver is configured to operate in NR V2X mode 1, in which scheduling of resources for the communication with the at least one other transceiver is performed by the central transceiver, wherein the transceiver is configured to transmit the data packet on a NR V2X mode 1 resource pool of the sidelink resource pools of the wireless communication system, and wherein the transceiver is configured to re-transmit the data packet at least once on the same or a different mode 1 NR V2X resource pool, the same or a different mode 3 LTE V2X resource pool, a LTE V2X mode 4 resource pool, a shared resource pool, an unshared resource pool or an exceptional resource pool of the sidelink resource pools of the wireless communication system.

In embodiments, the transceiver is served by a central transceiver, for example, a base station, of the wireless communication system, wherein the transceiver is configured to operate in D2D mode 1, in which scheduling of resources for the communication with the at least one other transceiver is performed by the central transceiver, wherein the transceiver is configured to transmit the data packet on the same or different D2D mode 1 resource pool of the sidelink resource pools of the wireless communication system, and wherein the transceiver is configured to re-transmit the data packet at least once on a D2D mode 2 resource pool, a shared resource pool, an unshared resource pool or an exceptional resource pool of the sidelink resource pools of the wireless communication system.

In embodiments, the transceiver is configured to operate in (e.g., LTE) V2X Mode 4, wherein the transceiver is configured to schedule resources for the sidelink communication autonomously, wherein the transceiver is configured to transmit the data packet on a (e.g., LTE) V2X mode 4 resource pool of the sidelink resource pools of the wireless communication system, and wherein the transceiver is configured to re-transmit the data packet at least once on a (e.g., LTE) V2X mode 3 resource pool, a shared resource pool, an unshared resource pool or an exceptional resource pool of the sidelink resource pools of the wireless communication system.

In embodiments, the transceiver is configured to operate in NR V2X Mode 2, wherein the transceiver is configured to schedule resources for the sidelink communication autonomously, wherein the transceiver is configured to transmit the data packet on a NR V2X mode 2 resource pool of the sidelink resource pools of the wireless communication system, and wherein the transceiver is configured to re-transmit the data packet at least once on a NR V2X mode 2 resource pool, a NR V2X mode 1 resource pool, a LTE V2X mode 4 resource pool, a LTE V2X mode 3 resource pool, a shared resource pool, an unshared resource pool or an exceptional resource pool of the sidelink resource pools of the wireless communication system.

In embodiments, the transceiver is configured to operate in D2D Mode 2, wherein the transceiver is configured to schedule resources for the sidelink communication autonomously, wherein the transceiver is configured to transmit the data packet on a D2D mode 2 resource pool of the sidelink resource pools of the wireless communication system, wherein the transceiver is configured to re-transmit the data packet at least once on a D2D mode 2 resource pool, a D2D mode 1 resource pool, a shared resource pool, an unshared resource pool or an exceptional resource pool of the sidelink resource pools of the wireless communication system.

In embodiments, the transceiver is configured to, in case RLF (Radio Link Failure)/no-sensing information or handover is available, to transmit said data packet on an exceptional resource pool of the sidelink resource pools of the wireless communication system, and to re-transmit said data packet at least once on a previously [e.g., prior to RLF/no-sensing information or handover available] used resource pool of the sidelink resource pools of the wireless communication system.

In embodiments, the transceiver is configured to, in case of carrier aggregation, to transmit said data packet on a component carrier, and to re-transmit said data packet at least once on another component carrier.

Further embodiments provide a transceiver for a wireless communication system, wherein the transceiver is configured to communicate with at least one other transceiver of the wireless communication system, wherein the transceiver is configured to transmit a data packet on a component carrier to the other transceiver of the wireless communication system, wherein the transceiver is configured to, if a PPPR value associated with said data packet or with data contained in said data packet indicates a high reliability, to re-transmit said data packet at least once on at least one other component carrier.

In embodiments, the transceiver is configured to retransmit said data packet at least once, if the PPPR value indicates a reliability that is equal to or higher than a predefined reliability or threshold.

In embodiments, the transceiver is served by a central transceiver, for example, a base station, of the wireless communication system, wherein the transceiver is configured to operate in LTE V2X mode 3, NR V2X mode 1 or D2D mode 1 in which scheduling of resources for the communication with the at least one other transceiver is performed by the central transceiver.

In embodiments, the transceiver is configured to operate in LTE V2X Mode 4, NR V2X mode 2 or D2D mode 2, wherein the transceiver is configured to schedule resources for the sidelink communication autonomously.

In embodiments, the transceiver is configured to operate using carrier aggregation.

Further embodiments provide a transceiver for a wireless communication system, wherein the transceiver is configured to communicate with at least one other transceiver of the wireless communication system using sidelink resource pools of the wireless communication system, wherein the transceiver is configured to transmit a data packet on one of the sidelink resource pools of the wireless communication system to the other transceiver of the wireless communication system, wherein the transceiver is configured to, if a PPPR value associated with said data packet or with data contained in said data packet indicates a high reliability, to re-transmit said data packet at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers.

In embodiments, the transceiver is configured to retransmit said data packet at least once, if the PPPR value indicates a reliability that is equal to or higher than a predefined reliability or threshold.

In embodiments, the transceiver is served by a central transceiver, for example, a base station, of the wireless communication system, wherein the transceiver is configured to operate in LTE V2X mode 3, NR V2X mode 1 or D2D mode 1 in which scheduling of resources for the communication with the at least one other transceiver is performed by the central transceiver.

In embodiments, the transceiver is configured to operate in LTE V2X mode 4, NR V2X mode 2 or D2D mode 2, wherein the transceiver is configured to schedule resources for the sidelink communication autonomously.

Further embodiments provide a method for transmitting data packets in a wireless communication system between at least two transceivers communicating with each other using sidelink resource pools [e.g., mode 3 resource pool, mode 4 resource pool, shared resource pool, unshared resource pool or exceptional resource pool] of the wireless communication system. The method comprises a step of transmitting a data packet on one of the sidelink resource pools of the wireless communication system to the other transceiver of the wireless communication system. Further, the method comprises a step of re-transmitting said data packet at least once on another sidelink resource pool of the sidelink resource pools of the wireless communication system, if a PPPR value associated with said data packet or with data contained in said data packet indicates a high reliability [of said data packet].

Further embodiments provide a method for transmitting data packets in a wireless communication system between at least two transceivers communicating with each other. The method comprises a step of transmitting a data packet on a component carrier to the other transceiver of the wireless communication system. Further, the method comprises a step of re-transmitting said data packet at least once on at least one other component carrier, if a PPPR value associated with said data packet or with data contained in said data packet indicates a high reliability.

Further embodiments provide a method for transmitting data packets in a wireless communication system between at least two transceivers communicating with each other using sidelink resource pools of the wireless communication system. The method comprises a step of transmitting a data packet on one of the sidelink resource pools of the wireless communication system to the other transceiver of the wireless communication system. Further, the method comprises a step of re-transmitting said data packet, if a PPPR value associated with said data packet or with data contained in said data packet indicates a high reliability, at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers.

Further embodiments provide a high priority data handling considering the respective reliability for packet duplication on shared/unshared/exceptional resource pools by using PPPR.

Further embodiments use PPPR information for network slicing.

Further embodiments use the PPPR value to allow resource reservation in the consecutive resource pool by adding pseudo data in the current resource pool (SCI).

Since Rel-13, ProSe per packet priority (PPPP) has been defined for maintaining QoS in V2X. The application layer sets the priority for every V2X messages and passes this to the lower layers. The MAC layer then does the logical channel prioritization and maps the logical channels to transport channels based on the priorities. The PPPP takes into account the latency used both in eNB and the UE. Recently, in order to maintain and support the stringent requirements of the advanced use cases ProSe per packet reliability (PPPR) has been defined. With PPPR the reliability can now be taken into account for satisfying the defined requirement between 90% to 99.999%.

Embodiments include:
- Using transmission pools for duplicating packets by taking into account the PPPR information
  - In case of a (e.g., LTE V2X) mode 3 based UE, the PPPR information can be provided to the eNB by the UE for resource reservation.
  - In case of (e.g., LTE V2X) mode 4 based UE, the UE can either do sensing for allocating the resources or a grant-free access according to the PPPR or any combination of PPPP and CBR.
  - Packets with the low PPPR (i.e. requesting high reliability) can then be duplicated on the shared resource pool or in the same mode but on different carriers (if the UE supports CA).
  - During a handover or a resource reselection or even during normal operation (if allowed), if low PPPR and/or low PPPP value messages occur (demanding high reliability and low latency) then the exceptional pool can be used for packet duplication plus the last (pre)configured resource pool.
- A mapping for each network slice demanding a defined latency and/or reliability to a PPPP and/or PPPR value, respectively. This way the RAN can ensure the best fitting handling to ensure the demanded latency and reliability for the individual network slice.
- Allowing resource reservation restricted to high reliability requests (i.e. low PPPR values) in the consecutive resource pool by adding pseudo data in the current resource pool.

Embodiments provide a mechanism to
Enhance the existing QoS by using new schemes based on the PPPR both in layer 2&3.

Embodiments contribute to
Enhancing the QoS in the RAN by using new approaches based on the PPPR to guarantee the respective reliability
The use of priority schemes for assisting packet duplication in V2X.
the use of the PPPR/PPPP to assess packet sharing between resource pool for Mode 3 and Mode 4, i.e.,
When PPPR threshold is reached, perform packet duplication on the shared resources
If PPPP threshold is reached, transmit different packets on the selected pools
Enhancing the QoS for network slices by mapping the slice specific latency and reliability requirements to the PPPP and PPPR, respectively and to ensure the most appropriate processing in RAN to fulfill the requirements.

BRIEF DESCRIPTION OF THE DRAWINGS

Embodiments of the present invention are described herein making reference to the appended drawings.

DETAILED DESCRIPTION OF THE INVENTION

Figure 1:
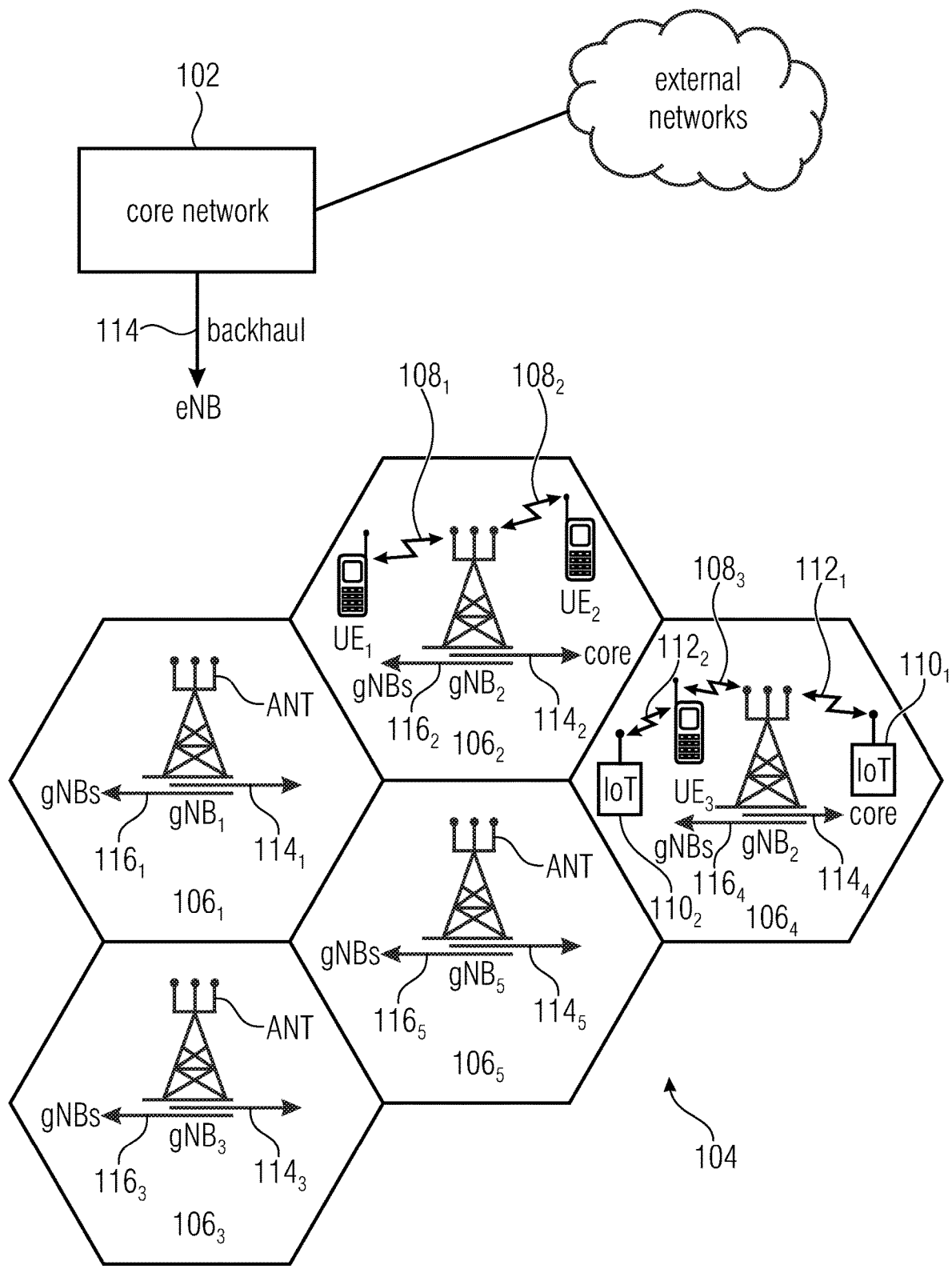
FIG. 1 shows a schematic representation of an example of a wireless communication system.
Figure 2:
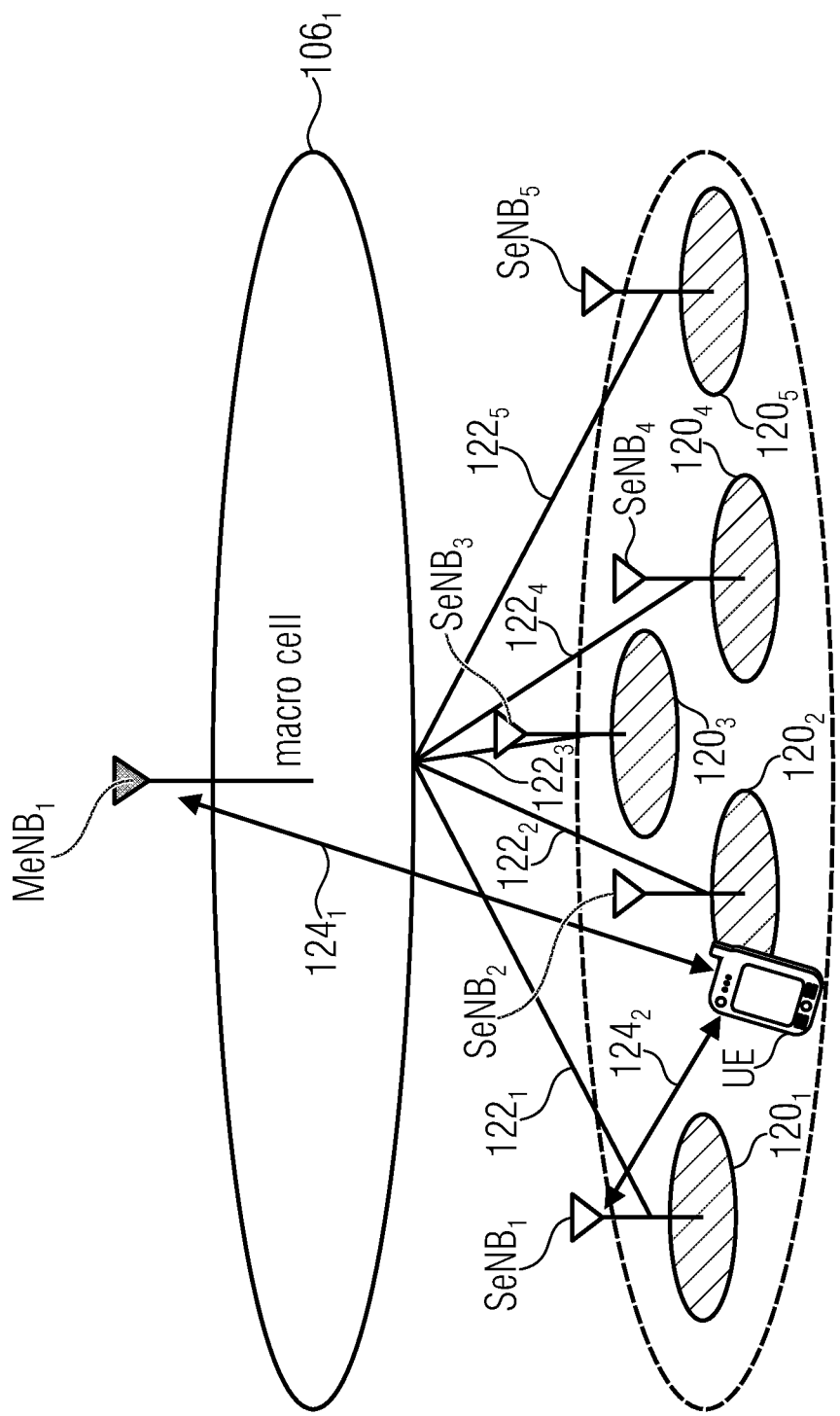
FIG. 2 is a schematic representation of a cell, like cell 106₁ in FIG. 1, having two distinct overlaid networks, the networks comprising a macro cell network including the macro cell 106₁, and a small cell network.
Figure 3:
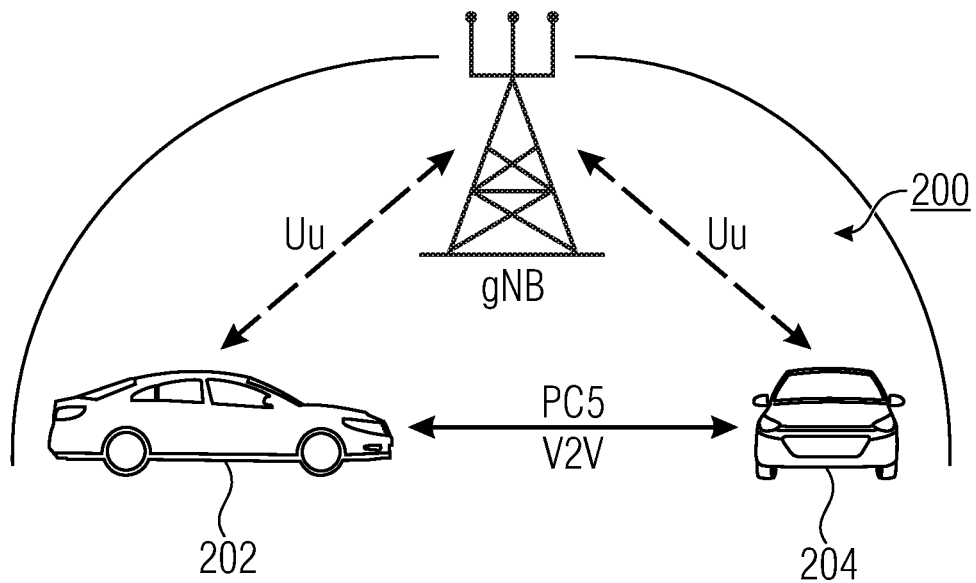
FIG. 3 shows a schematic representation of a situation in which UEs directly communicating with each other are in coverage of a base station.
Figure 4:
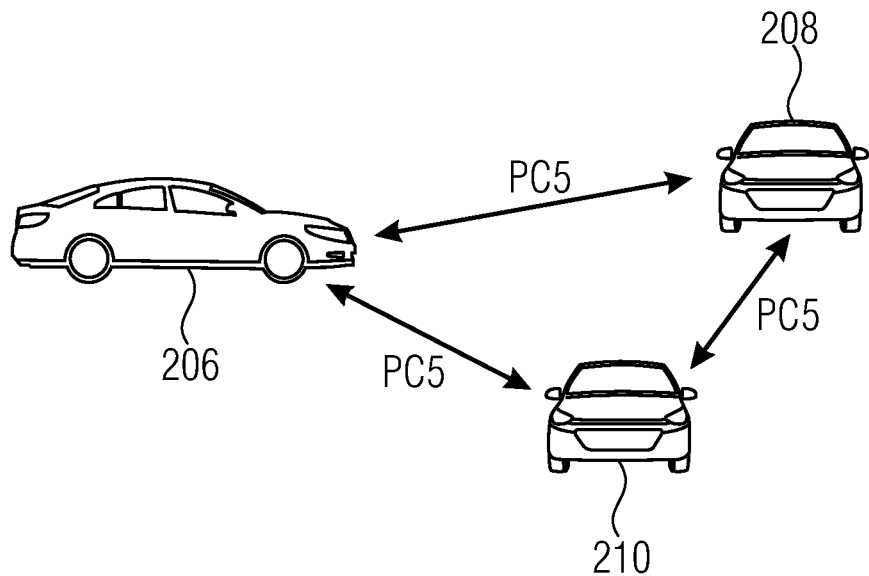
FIG. 4 shows a scenario in which UEs directly communicating with each other are not are not in coverage of a base station, i.e., are not connected to a base station.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 5A:
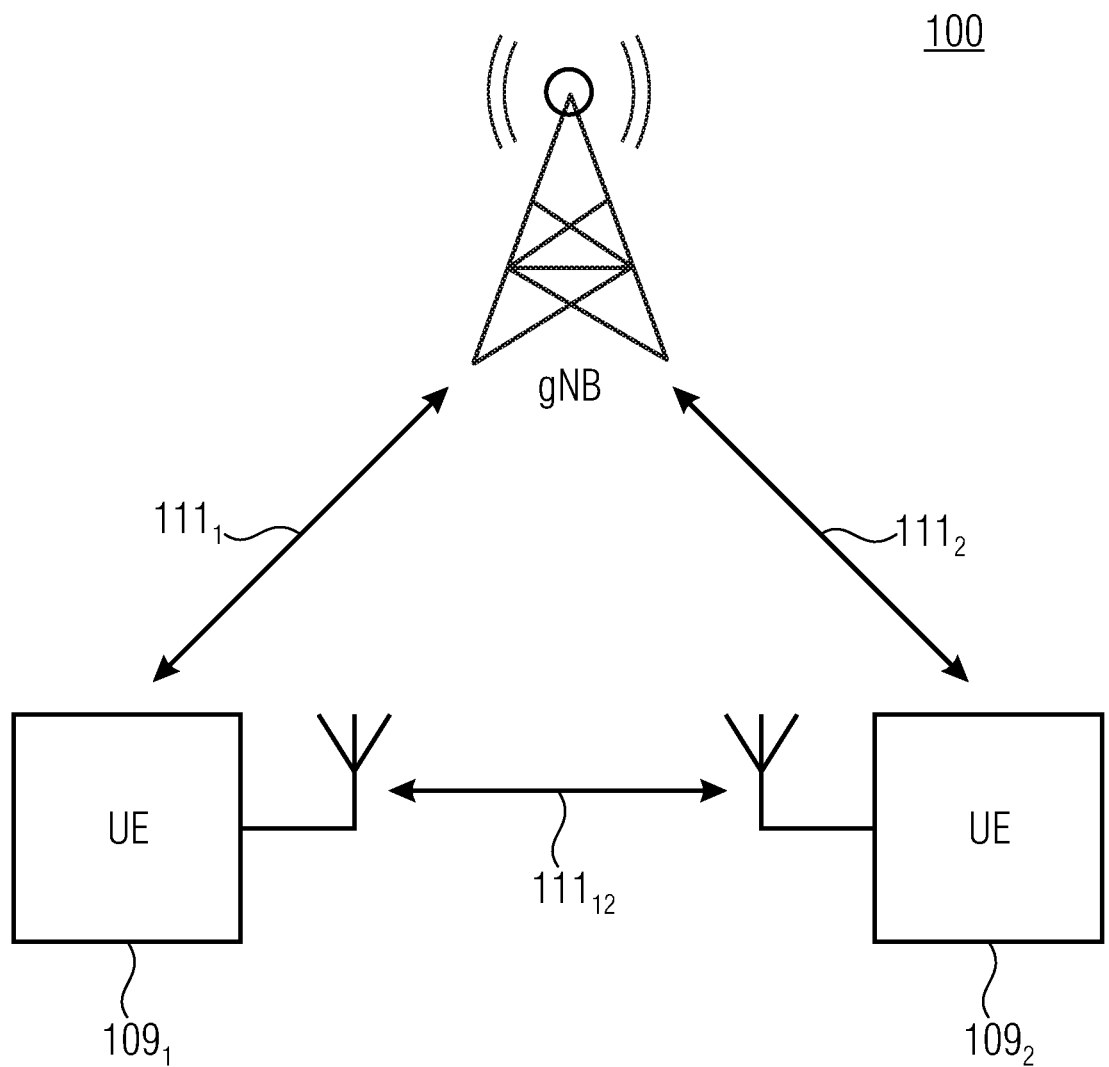
FIG. 5a shows a schematic block diagram of a transceiver for a wireless communication network, according to an embodiment of the present invention.

FIG. 5a shows a schematic block diagram of a transceiver $109_1$ (e.g., a UE of a device or vehicle) of a wireless communication system 100, according to an embodiment of the present invention. The transceiver $109_1$ is configured to communicate $111_{12}$ with at least one other transceiver $109_2$ of the wireless communication system 100 using sidelink resource pools of the wireless communication system 100.

Thereby, the transceiver $109_1$ can be configured to transmit a data packet on one of the sidelink resource pools of the wireless communication system 100 to the other transceiver $109_2$ of the wireless communication system 100, wherein the transceiver $109_1$ can be configured to, if a PPPR value associated with said data packet or with data contained in said data packet indicates a high reliability, to re-transmit said data packet at least once
  on another sidelink resource pool of the sidelink resource pools of the wireless communication system 100,
  or on the same resource pool of the sidelink resource pools of the wireless communication system, but on different carriers.

In case of carrier aggregation (CA), the transceiver $109_1$ also (e.g., alternatively or additionally) can be configured to transmit the data packet on a component carrier (e.g., a first component carrier) to the other transceiver $109_2$ of the wireless communication system 100, wherein the transceiver can be configured to, if a PPPR value associated with said data packet or with data contained in said data packet indicates a high reliability, to re-transmit said data packet at least once on at least one other component carrier (e.g., a second component carrier different from the first component carrier).

In embodiments, the transceiver $109_1$ can be configured to retransmit said data packet at least once, if the PPPR value indicates a reliability (or priority) that is equal to or higher than a predefined reliability or threshold.

Note that, in some communication standards, a PPPR value of 1 may indicate the highest reliability (or priority), wherein a PPPR value of 8 may indicate the lowest priority.

In this case, the transceiver $109_1$ can be configured to retransmit said data packet at least once, if the PPPR value is equal to or smaller than the predefined reliability or threshold, such as, for example, 4 (or 3, or 2, or 1). Naturally, also other predefined reliability values or thresholds may apply in dependence on the employed communication standard.

For example, in case of 3GPP TS23.285. the predefined reliability values or thresholds can be 1 to 8.

As indicated in FIG. 5a by way of example, the communication system 100 optionally may comprise a base station, such as gNB or eNB. Thereby, the transceiver $109_1$ and, e.g., also the other transceiver $109_2$ can be configured to communicate $111_1$ and $111_2$ with the base station, when the transceivers $109_1$ and $109_2$ are in-coverage of the base station. The transceivers $109_1$ and $109_2$ (or at least one of the transceivers $109_1$ and $109_2$) also could be out-of-coverage of the base station. In both cases, i.e. in coverage mode and in out-of-coverage mode, the transceiver $109_1$ can be configured to communicate directly (=sidelink communication) with the other transceiver $109_2$ of the wireless communication system 100, e.g., using a sidelink resource pool of the wireless communication system.

In dependence on the employed wireless communication standard, the in-coverage mode can be referred to as LTE V2X mode 3 or NR V2X mode 1 or D2D mode 1, wherein the out-of-coverage mode can be referred to as V2X mode 4 or NR V2X mode 2 or D2D mode 2.

Subsequently, embodiments of the transceiver $109_1$ are described in further detail. Thereby, in the following description, it is primarily made reference to a communication standard in which the in-coverage and out-of-coverage modes are referred to as LTE V2X modes 3 and 4, respectively, to explain the functionality of the transceiver $109_1$ in the corresponding in-coverage and out-of-coverage modes. Naturally, the following description does also apply to other wireless communication standards in which the in-coverage and out-of-coverage modes are referred to as, for example, NR V2X mode 1 and NR V2X mode 2, or D2D mode 1 and D2D mode 2, respectively.

The idea is specifically related to V2X services demanding highly reliable data transmission. High reliability is indicated by the newly introduced PPPR.

Currently neither the range nor the mappings of the PPPR value to the requested reliability are finally defined. It is assumed that the same setting may apply as for the PPPP for the given description. However, if the final PPPR definition would be different, the description would need to be read using the final definition.

The PPPR (based on PPPP) would thus range from 1 to 8, where 1 indicated the highest reliability and 8 respectively, the lowest reliability.

The most common approach to improve the reliability is packet duplication, which is already defined for V2X. However, the idea of how to interpret the PPPR as well as the scheme for packet duplication based on the PPPR are no readily defined and therefore invented as described below.

Embodiment 1

Embodiments provide high priority data handling considering the respective reliability for packet duplication on shared/unshared/exceptional resource pools by using PPPR.

During the currently ongoing Rel. 15 V2X specification one major topic is the definition of resource pool sharing between mode 3 and mode 4. During the last RAN2 #101 meeting it was agreed that mode 3 UEs are allowed to share Mode 4 UE resource pools. Prerequisite for the mode 3 UEs is the sensing of the mode 4 resource pools prior to data transmission to reduce the risk of interfering with Mode 4 UE data transmission.

Figure 5B:
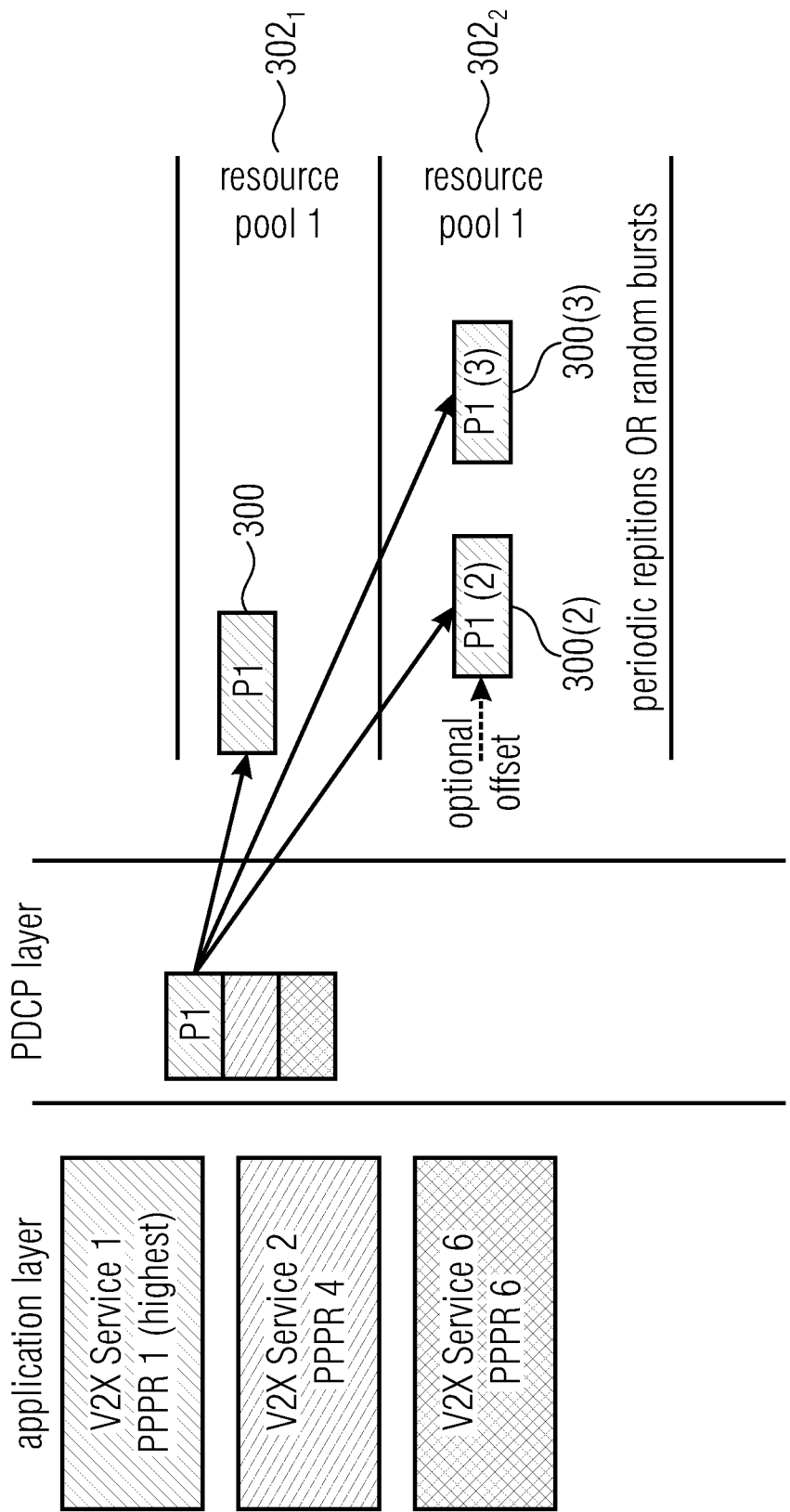
FIG. 5b shows a schematic diagram of an example of a duplication scheme for packet 1 (P1) with highest reliability (lowest PPPR)

FIG. 5b shows a schematic diagram of an example of a duplication scheme for packet 1 (P1) with highest reliability (lowest PPPR).

In detail, FIG. 5b shows in a diagram a transmission of a data packet 300 on a sidelink resource pool $302_1$ of the wireless communication system, wherein the data packet 300 is retransmitted on another resource pool $302_2$ of the wireless communication system. Thereby, the ordinate denotes the frequency and the abscissa the time. As shown in FIG. 5b, the data packet 300 can be re-transmitted one or two times on the other resource pool $302_2$. Retransmissions of the data packet are indicated in FIG. 5b with reference numerals 300(1) and 300(2).

4. Either mode 3 or mode 4, in case of carrier aggregation (CA), after high reliability indication (indicated by the PPPR) threshold is triggered, the UE $109_1$ selects to duplicate resources transmitted on component carrier #i (CC-i) (say resource pool 1 ($302_1$) in FIG. 5b) on another CC-ii (say resource pool 2 ($302_2$) in FIG. 5b) or more CC and more pools; if—and only if—carrier aggregation is possible 5. The duplicated data packet(s) 300(1) and 200(2) could be transmitted either on the shared resource pool or the exceptional pool on the associated mode 3/4 resource pool or on any combination of the shared, the associated mode 3 or 4 and/or the exceptional resource pool one or multiple times.

The following table describes all possible scenarios for resource pool 1 and 2 in FIG. 5b:

| Scenario | Resource Pool 1 | Resource Pool 2 | |
|---|---|---|---|
| Mode 3 share Mode 4 resources | Mode 3 | Mode 4 | Original data transmission on RP of Mode 3 and duplication happens on Mode 4 |
| Mode 4 share Mode 3 resources | Mode 4 | Mode 3 | Original data transmission on RP of Mode 4 and duplication happens on Mode 3 |
| RLF/no-sensing information available/handover | Exceptional Resource Pool | Any available (previously used) resource pool or the ITS frequency band | Data transmission of duplicated resources may be altered by the availability of resource pool 2, e.g., based on sensing or previous CBR values |
| Carrier aggregation | Main/previously used CC | Secondary or more CCs | |

As indicated in FIG. 5b, embodiments use the shared resource pools for packet duplications 300(2) and 300(3) for V2X services demanding high reliability indicated by the PPPR.

If high reliability is indicated for V2X data transmission on the sidelink, the duplicated packets 300(2) and 300(3) could be transmitted on the shared or any type of unshared resource pool. In detail the idea includes for resource pool use:

1. In case of a mode 3 UE $109_1$ and high reliability (indicated by the PPPR), the mode 3 UE $109_1$ could transmit the data 300 on resource pool 1 ($302_1$) in FIG. 5b (e.g. the mode 3 resource pool) and the duplicated packet 300(2) or 200(3) in addition on the resource pool 2 ($302_2$) in FIG. 5b (e.g. the shared resource pool)).
2. In case of a mode 4 UE $109_1$ and high reliability (indicated by the PPPR), the mode 4 UE $109_1$ could transmit the data 300 on the resource pool 1 ($302_1$) in FIG. 5b (e.g. the mode 4 resource pool) and the duplicated packet 300(1) or 300(2) in addition on the resource pool 2 ($302_2$) in FIG. 5b (e.g. the shared resource pool)
3. Either mode 3 or mode 4, in case of RLF/no-sensing information available or handover, after high reliability indication (indicated by the PPPR) threshold is triggered, the UE $109_1$ selects to duplicate resources transmitted on the legacy exceptional resource pool (say resource pool 1 ($300_1$) in FIG. 5b) on a (pre)configured resources or last used resources (say resource pool 2 ($300_2$) in FIG. 5b).

Figure 6:
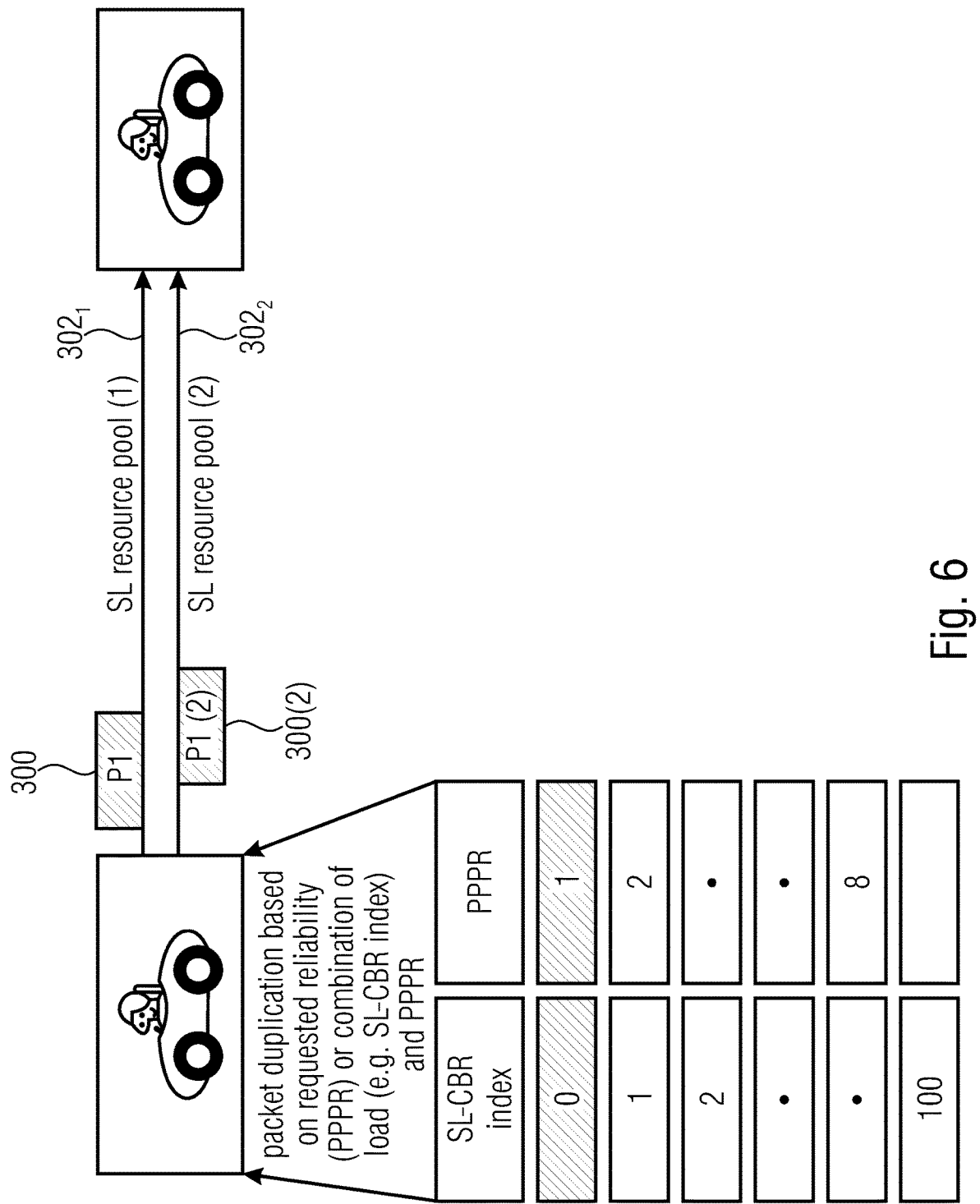
FIG. 6 shows a schematic diagram of an input for the decision on packet duplication.

FIG. 6 shows a schematic diagram of an input for the decision on packet duplication.

In detail, the idea includes for the packet duplication scheme:

1. The decision on duplicated multiple transmissions 300(2) and 300(3) depend on the PPPR value (representing the requested reliability) and may also consider in addition the channel load (FIG. 6). The channel load could be deduced from the SL-CBR (SL-CBR=sidelink channel busy ratio).
2. In case both the PPPP and SL-CBR are considered, the packet duplication decision could be:

IF SL-CBR > SL-CBR-threshold)
IF (PPPR > PPPR-threshold)
duplicate packet(s);

3. Optional, depending on PPPR or SL-CBR & PPPR combination, a multiplication factor may be selected to transmit the same packet 300, 300(2) and 300(3) multiple times as given by the multiplication factor
4. In case the packet 300 is transmitted more than one time, there could be a fixed offset using a periodic transmission for the next packet transmission 300(2) and 300(3) or random bursts for packet transmission (see FIG. 5b)
5. The duplicated packet 300(2), 300(3) could be sent on the shared pool either In the same period as the "original" packet 300 (which implies that sensing might not yet be performed).

This could be applicable in case low latency is indicated e.g. by a low PPPP.

Deferred in the current or next secondary resource pool by a defined or random offset.

In one of the consecutive secondary resource pools, this may apply if low latency is not required. This could ensure the use of the sensing mechanism to possibly avoid interfering with other UEs $109_2$ data transmission (and thus, increase the probability for successful data transmission).

6. How to decide on packet duplication/multiplication based on the PPPR or the PPPR/CL-CBR combination could either be hardcoded or configurable. One example for a configurable threshold based mapping is explained in this list (see item 2.). Additionally, a SL_CBR-PPPR table may apply [2]—similar to the SL-CBR-PPPP-TxConfigList information element for the PPPP to identify whether packet duplication should be performed. Using this list also the information, how often the packets should be transmitted, could be derived.

A freely configurable or pre-defined or hard-coded table could be used to provide the mapping of the PPPR value to the packet duplication. Note: in mode 3 the packet duplication will be controlled by the base station using e.g. either RRC signaling or MAC CE (control element) or both of them.

Embodiment 2

In embodiments, the PPPR information is used for network slicing.

From Rel 15 onwards also the new concept of network slicing applies for the RAN.

Figure 7:
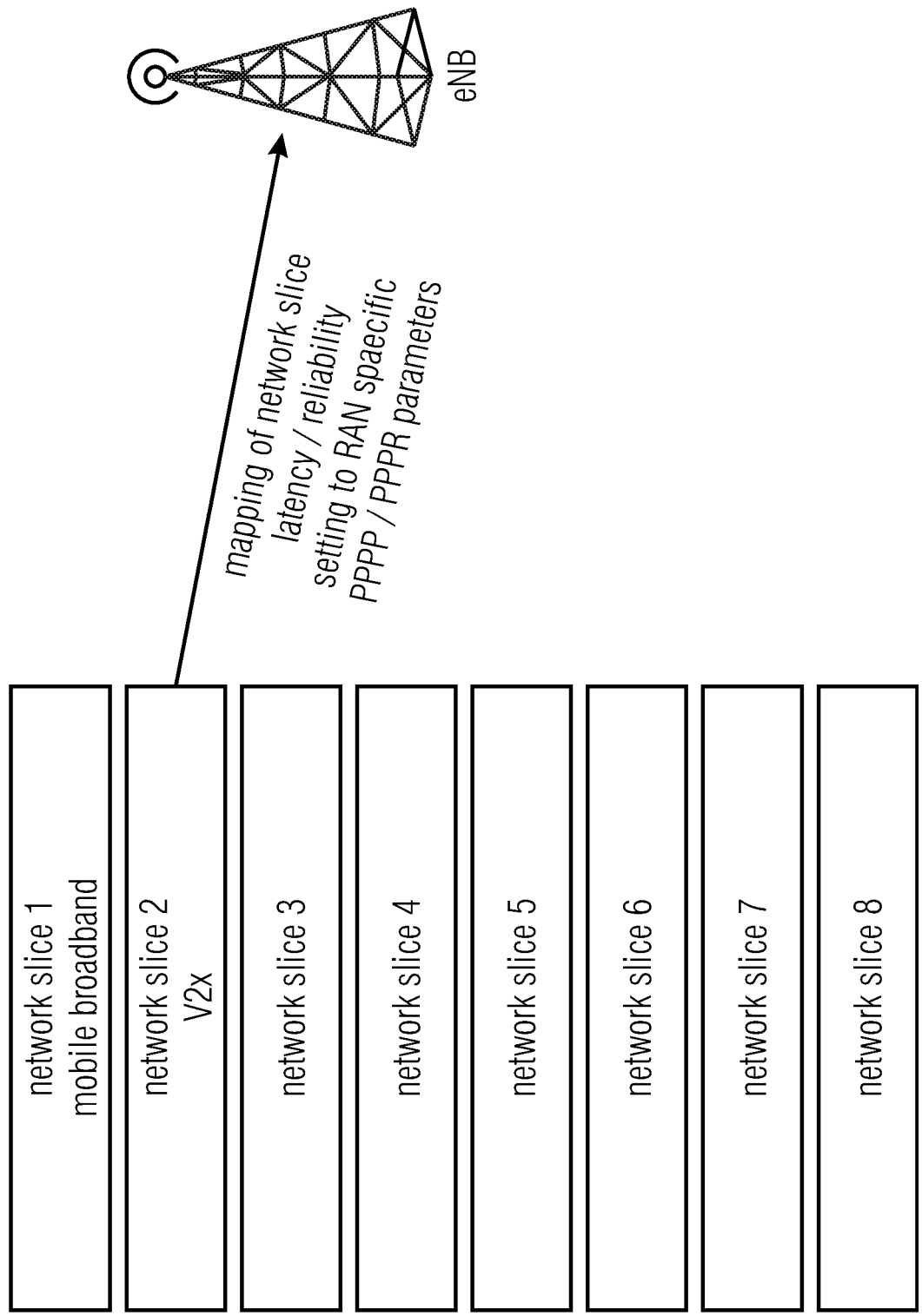
FIG. 7 shows a schematic diagram of mapping of network slices to PPPP/PPPR for RAB priority handling.

FIG. 7 shows a schematic diagram of mapping of network slices to PPPP/PPPR for RAB (Radio Access Bearer) priority handling.

Each network slice typically represents a service, e.g. mobile broadband or V2X with a defined set of parameters. The detailed handling for network slices in RAN is not yet defined.

To ensure the demanded latency and reliability for each network slice, the requested latency/reliability could be mapped for each network slice to a PPPP and PPPR value, respectively.

This could be applied at least for any V2X related service slice, but may not be limited to it.

Using either the already defined mechanisms for the PPPP as well as the new schemes for the PPPR (as proposed in embodiment 1 and 2) or any combination of the 2 schemes, each network slice could be processed in the RAN in a way to ensure meeting the requested reliability and latency.

How to map each network slice to the PPPP and/or PPPR could either be hardcoded or configurable.

Either a freely configurable or pre-defined or hard-coded table could be used to provide this mapping.

Or thresholds could be used to for the defined latency/reliability per service slice to map to the best fitting PPPP and/or PPPR, respectively.

Embodiment 3

In embodiments, the PPPR value is used to allow resource reservation in the consecutive resource pool by adding pseudo data in the current resource pool (SCI).

In addition to packet duplication, high reliability (indicated by low PPPR) could also be ensured by resource reservation of mode 4 UEs in the next resource pool.

The idea is here to add pseudo data in the mode 4 resource pool (e.g. to the SCI), to indicate resource pool usage for sensing mode 3 UEs (trying to use the mode 4 resource pool for sharing) as well as other mode 4 UEs.

As a result, the sensing UEs will not transmit data in the consecutive mode 4 resource pool. Thus, the mode 4 UE adding pseudo data (e.g. in the SCI) will increase the reliability for critical (highly reliable) in the consecutive resource pool, i.e. increase the probability of successful data transmission avoiding collision with data packets from other mode 3 or 4 UEs.

However, the mechanism could be strongly limited to very high reliability requesting services (low PPPR), which uses the transmission of defined data (e.g. positioning or further important details in case of emergency) to avoid wasting of resources.

Embodiments described herein can be implemented, for example, in V2X, D2D, mMTC, URLLC, and critical communication.

Figure 8:
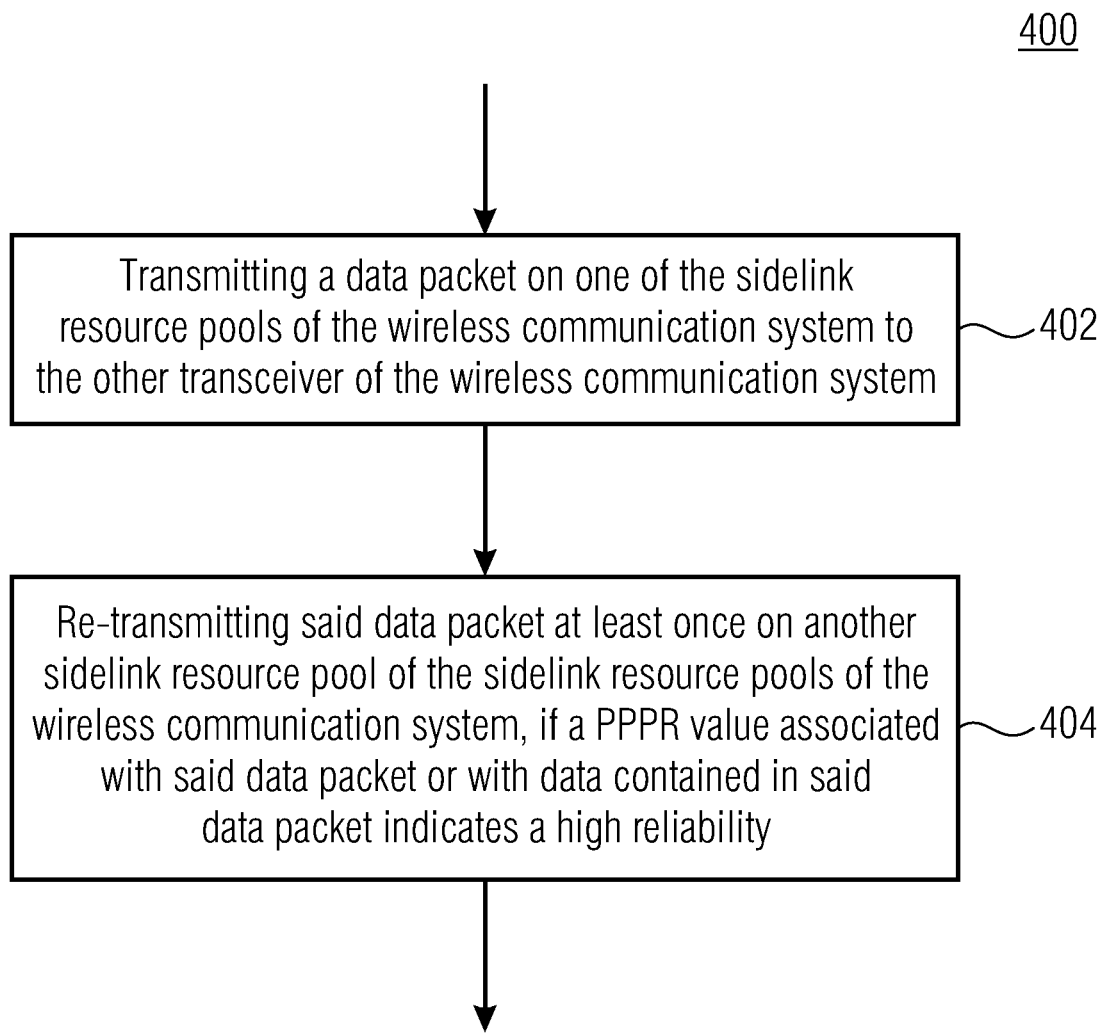
FIG. 8 shows a flowchart of a method for transmitting data packets in a wireless communication system between at least two transceivers communicating with each other using sidelink resource pools, according to an embodiment of the present invention.

FIG. 8 shows a flowchart of a method 400 for transmitting data packets in a wireless communication system between at least two transceivers communicating with each other using sidelink resource pools (e.g., mode 3 resource pool, mode 4 resource pool, shared resource pool, unshared resource pool or exceptional resource pool) of the wireless communication system. The method 400 comprises a step 402 of transmitting a data packet on one of the sidelink resource pools of the wireless communication system to the other transceiver of the wireless communication system. Further, the method 400 comprises a step 404 of re-transmitting said data packet at least once on another sidelink resource pool of the sidelink resource pools of the wireless communication system, if a PPPR value associated with said data packet or with data contained in said data packet indicates a high reliability [of said data packet].

Figure 9:
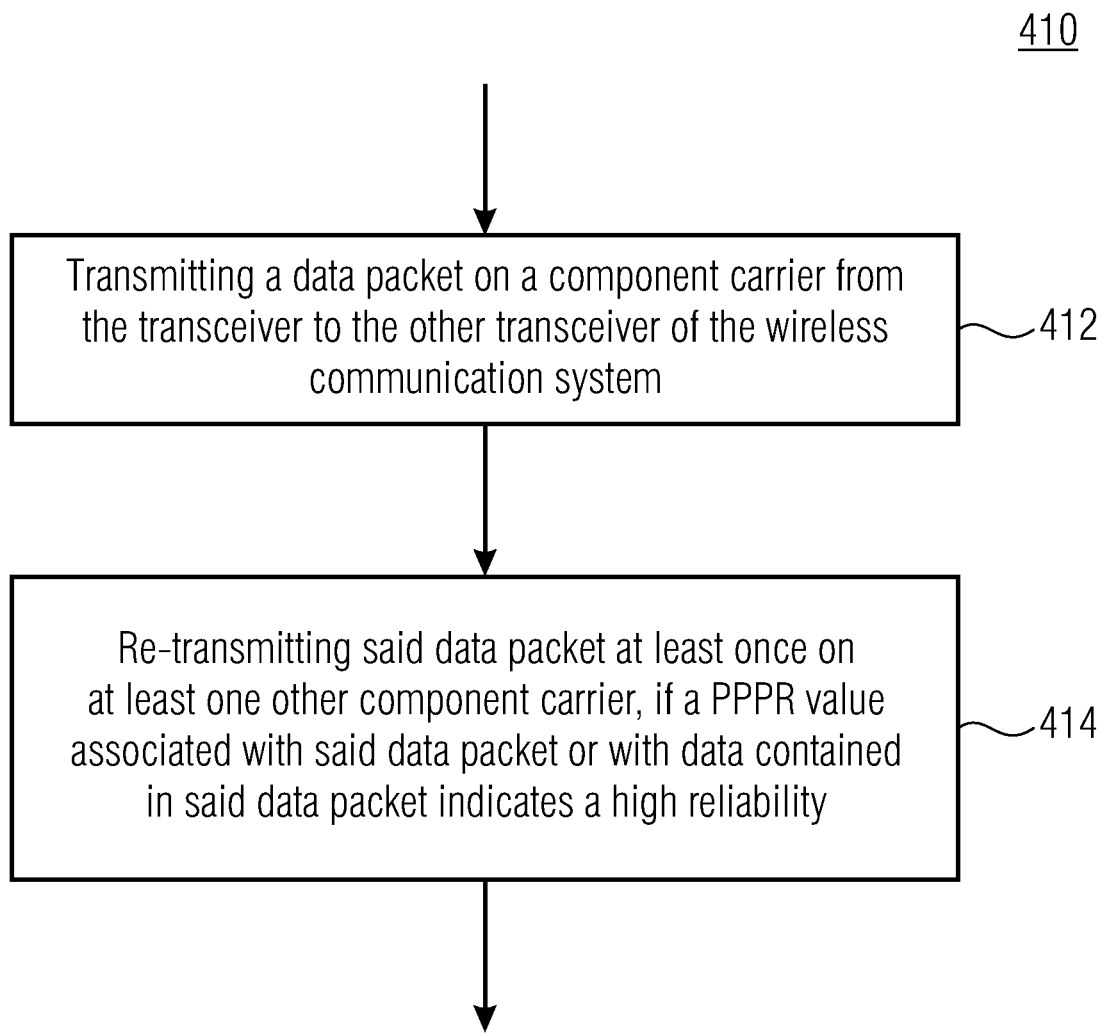
FIG. 9 shows a flowchart of a method for transmitting data packets in a wireless communication system between at least two transceivers communicating with each other using sidelink resource pools, according to a further embodiment of the present invention.

FIG. 9 shows a flowchart of a method 410 for transmitting data packets in a wireless communication system between at least two transceivers communicating with each other. The method 410 comprises a step 412 of transmitting a data packet on a component carrier to the other transceiver of the wireless communication system. Further, the method 410 comprises a step 414 of re-transmitting said data packet at least once on at least one other component carrier, if a PPPR value associated with said data packet or with data contained in said data packet indicates a high reliability.

Figure 10:
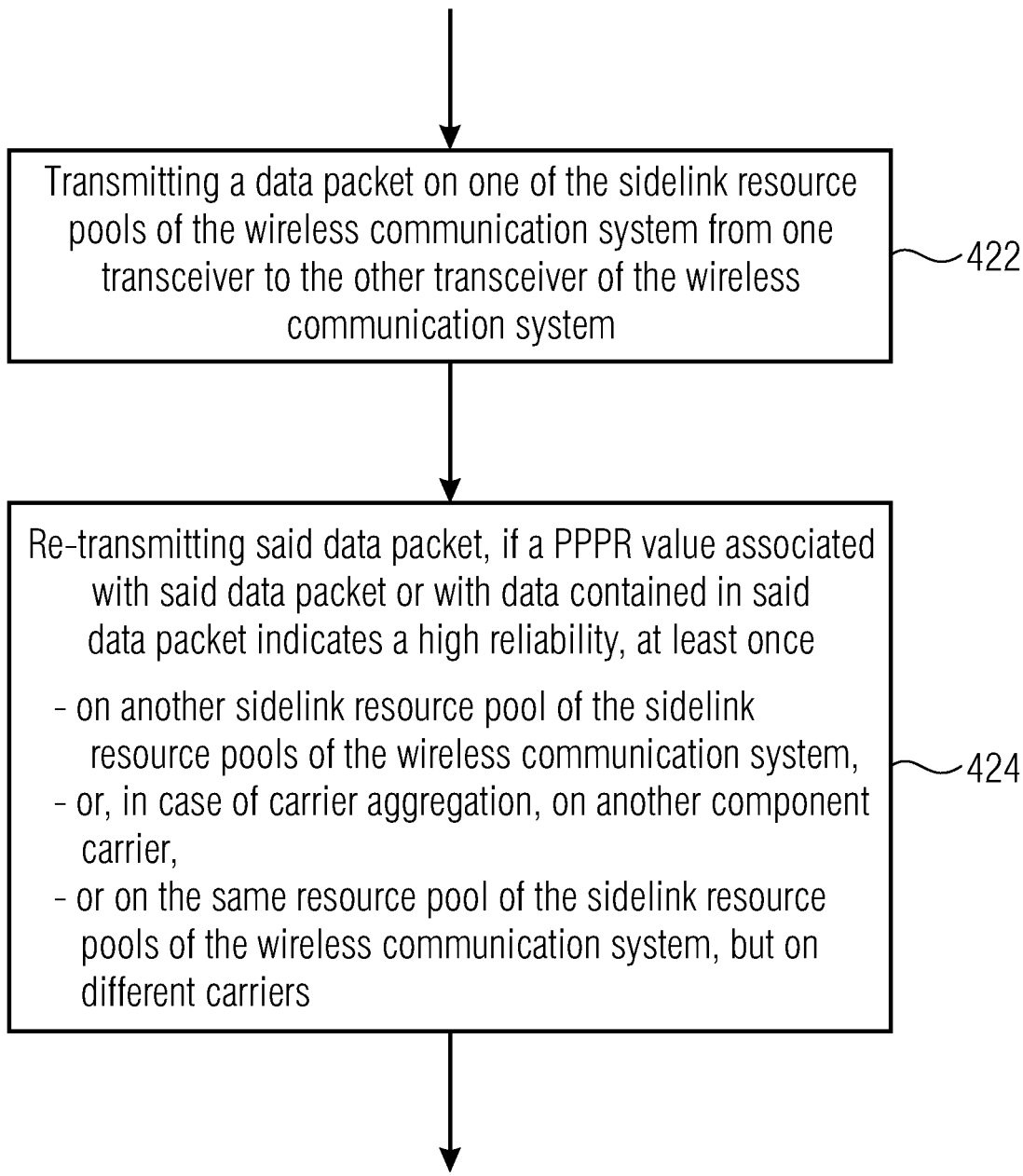
FIG. 10 shows a flowchart of a method for transmitting data packets in a wireless communication system between at least two transceivers communicating with each other using sidelink resource pools, according to a further embodiment of the present invention.

FIG. 10 shows a flowchart of a method 420 for transmitting data packets in a wireless communication system between at least two transceivers communicating with each other using sidelink resource pools of the wireless communication system. The method 420 comprises a step 422 of transmitting a data packet on one of the sidelink resource pools of the wireless communication system to the other transceiver of the wireless communication system. Further, the method 420 comprises a step 424 of re-transmitting said data packet, if a PPPR value associated with said data packet or with data contained in said data packet indicates a high reliability, at least once
- on another sidelink resource pool of the sidelink resource pools of the wireless communication system,
- or, in case of carrier aggregation, on another component carrier,
- or on the same resource pool of the sidelink resource pools of the wireless communication system, but on different carriers.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
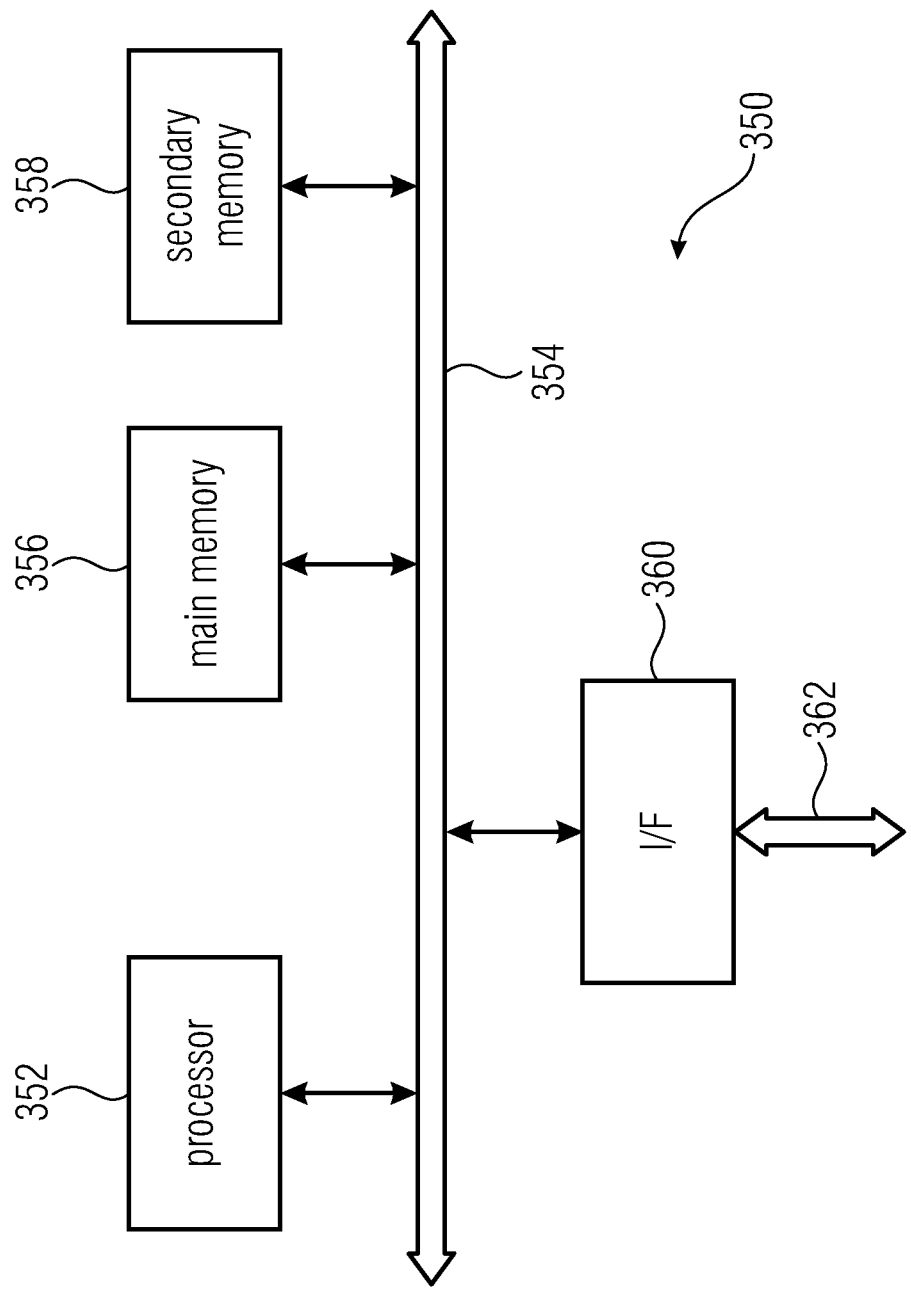
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the form electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF REFERENCES

[1] 3GPP TS 36.213 Evolved Universal Terrestrial Radio Access (E-UTRA); Physical layer procedures; V14.5.0
[2] 3GPP TS 36.331 Evolved Universal Terrestrial Radio Access (E-UTRA)-Radio Resource Control (RRC); V14
[3] 3GPP TS 36.211 Evolved Universal Terrestrial Radio Access (E-UTRA); Physical Channels and Modulation, v 14.3.0
[4] 3GPP TS 36.212 Evolved Universal Terrestrial Radio Access (E-UTRA); Multiplexing and channel coding, v 14.3.0

[5] 3GPP TS 36.321 Evolved Universal Terrestrial Radio Access (E-UTRA); Medium Access Control (MAC) protocol specification, v 14.3.0
[6] EP 3 273 634 A1 Improved support of Quality of Service for V2X Transmissions
[7] TDoc R2-18xxxx: Email discussion report on [101 #34][LTE/5GC] Slicing, (ongoing), planned for WG2 #101Bis meeting, April 2018
[8] 3GPP TR 23.285 Architecture enhancements for V2X services; V15.1.0
[9] 3GPP TS 36.300 Packet Data Convergence Protocol (PDCP) specification; V15.3.0
[10] TDoc R2-18xxxx: draft Report from [101 #72][LTE/V2X] Packet duplication, (ongoing), planned for WG2 #101Bis meeting, April 2018
[11] 3GPP TS 36.323 Packet Data Convergence Protocol (PDCP) specification, V15.1.0
[12] 3GPP TS 36.321 Medium Access Control (MAC) protocol specification, V15.3.0
[13] 3GPP TS 38.885 Study on NR Vehicle-to-Everything (V2X), V2.0.0
[14] 3GPP TS 23.501 System architecture for the 5G System (5GS)
[15] 3GPP TR 23.786 Study on architecture enhancements for the Evolved Packet System (EPS) and the 5G System (5GS) to support advanced V2X services
[16] 3GPP TS 23.287 Architecture enhancements for 5G System (5GS) to support Vehicle-to-Everything (V2X) services

LIST OF ABBREVIATIONS

BS Base Station
CBR Channel Busy Ratio
D2D Device-to-Device
EN Emergency Notification
EP Exceptional Pool
eNB Evolved Node B (base station)
gNB Next generation Node B (base station)
FDM Frequency Division Multiplexing
LTE Long-Term Evolution
PC5 Interface using the Sidelink Channel for D2D communication
PPPP ProSe per packet priority
PPPR ProSe per packet reliability
PRB Physical Resource Block
ProSe Proximity Services
RA Resource Allocation
SCI Sidelink Control Information
SL Sidelink
sTTI Short Transmission Time Interval
TDM Time Division Multiplexing
TDMA Time Division Multiple Access
UE User Entity (User Terminal or User Equipment)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A transceiver for a wireless communication system,
wherein the transceiver is configured to communicate with at least one other transceiver of the wireless communication system using sidelink resource pools of the wireless communication system,
wherein the transceiver is configured to transmit a data packet on one of the sidelink resource pools of the wireless communication system to the other transceiver of the wireless communication system,
wherein the transceiver is configured to, if a PPPR value associated with said data packet or with data comprised in said data packet indicates a high reliability, to re-transmit said data packet at least once on another sidelink resource pool of the sidelink resource pools of the wireless communication system,
wherein the transceiver
is served by a central transceiver of the wireless communication system, wherein the transceiver is configured to operate in LTE V2X mode 3, NR V2X mode 1 or D2D mode 1 in which scheduling of resources for the communication with the at least one other transceiver is performed by the central transceiver,
or is configured to operate in V2X Mode 4, NR V2X mode 2 or D2D mode 2, wherein the transceiver is configured to schedule resources for the sidelink communication autonomously.

2. The transceiver according to claim 1,
wherein a number of re-transmissions of said data packet depends on the PPPR value.

3. The transceiver according to claim 1,
wherein the transceiver is configured to acquire the PPPR value associated with said data packet or with the data comprised in said data packet.

4. The transceiver according to claim 1,
wherein the sidelink resource pools of the wireless communication system are at least two out of a mode 3 resource pool, a mode 4 resource pool, a shared resource pool, an unshared resource pool or an exceptional resource pool.

5. The transceiver according to claim 1,
wherein the PPPR value ranges from 1 to 8;
wherein a PPPR value of 1 indicates the highest reliability and a PPPR value of 8 indicates the lowest reliability.

6. The transceiver according to claim 1,
wherein the transceiver is configured to retransmit said data packet at least once, if the PPPR value exceeds a predefined threshold.

7. The transceiver according to claim 1,
wherein the transceiver is configured to retransmit said data packet at least once, if the PPPR value indicates a reliability that is equal to or higher than a predefined reliability.

8. The transceiver according to claim 1,
wherein the transceiver is served by a central transceiver of the wireless communication system, wherein the transceiver is configured to operate in V2X Mode 3, in which scheduling of resources for the communication with the at least one other transceiver is performed by the central transceiver,
wherein the transceiver is configured to transmit the data packet on a V2X mode 3 resource pool of the sidelink resource pools of the wireless communication system, and
wherein the transceiver is configured to re-transmit the data packet at least once on a V2X mode 4 resource pool, a shared resource pool, an unshared resource pool or an exceptional resource pool of the sidelink resource pools of the wireless communication system.

9. The transceiver according to claim 1,
wherein the transceiver is served by a central transceiver of the wireless communication system, wherein the transceiver is configured to operate in NR V2X mode 1, in which scheduling of resources for the communication with the at least one other transceiver is performed by the central transceiver, wherein the transceiver is configured to transmit the data packet on a NR V2X mode 1 resource pool of the sidelink resource pools of the wireless communication system, and wherein the transceiver is configured to re-transmit the data packet at least once on another or the same NR V2X mode 1 resource pool, a NR V2X mode 2 resource pool, a shared resource pool, an unshared resource pool or an exceptional resource pool of the sidelink resource pools of the wireless communication system.

10. The transceiver according to claim 1, wherein the transceiver is served by a central transceiver of the wireless communication system, wherein the transceiver is configured to operate in D2D mode 1, in which scheduling of resources for the communication with the at least one other transceiver is performed by the central transceiver, wherein the transceiver is configured to transmit the data packet on a D2D mode 1 resource pool of the sidelink resource pools of the wireless communication system, and wherein the transceiver is configured to re-transmit the data packet at least once on another or the same D2D mode 1 resource pool, a D2D mode 2 resource pool, a shared resource pool, an unshared resource pool or an exceptional resource pool of the sidelink resource pools of the wireless communication system.

11. The transceiver according to claim 1, wherein the transceiver is configured to operate in V2X Mode 4, wherein the transceiver is configured to schedule resources for the sidelink communication autonomously;

wherein the transceiver is configured to transmit the data packet on a V2X mode 4 resource pool of the sidelink resource pools of the wireless communication system, and wherein the transceiver is configured to re-transmit the data packet at least once on a V2X mode 3 resource pool, a shared resource pool, an unshared resource pool or an exceptional resource pool of the sidelink resource pools of the wireless communication system.

12. The transceiver according to claim 1, wherein the transceiver is configured to operate in NR V2X Mode 2, wherein the transceiver is configured to schedule resources for the sidelink communication autonomously;

wherein the transceiver is configured to transmit the data packet on a NR V2X mode 2 resource pool of the sidelink resource pools of the wireless communication system, and wherein the transceiver is configured to re-transmit the data packet at least once on another or the same NR V2X mode 2 resource pool, a NR V2X mode 1 resource pool, a shared resource pool, an unshared resource pool or an exceptional resource pool of the sidelink resource pools of the wireless communication system.

13. The transceiver according to claim 1, wherein the transceiver is configured to operate in D2D Mode 2, wherein the transceiver is configured to schedule resources for the sidelink communication autonomously;

wherein the transceiver is configured to transmit the data packet on a D2D mode 2 resource pool of the sidelink resource pools of the wireless communication system, and wherein the transceiver is configured to re-transmit the data packet at least once on another or the same D2D mode 2 resource pool, a D2D mode 1 resource pool, a shared resource pool, an unshared resource pool or an exceptional resource pool of the sidelink resource pools of the wireless communication system.

14. The transceiver according to claim 1, wherein the transceiver is configured to, in case RLF/no-sensing information or handover is available, to transmit said data packet on an exceptional resource pool of the sidelink resource pools of the wireless communication system, and to re-transmit said data packet at least once on a previously used resource pool of the sidelink resource pools of the wireless communication system.

15. The transceiver according to claim 1, wherein the transceiver is configured to, in case of carrier aggregation, to transmit said data packet on a component carrier, and to re-transmit said data packet at least once on another component carrier.

16. A transceiver for a wireless communication system, wherein the transceiver is configured to communicate with at least one other transceiver of the wireless communication system using sidelink resource pools of the wireless communication system, wherein the transceiver is configured to transmit a data packet on one of the sidelink resource pools of the wireless communication system to the other transceiver of the wireless communication system, wherein the transceiver is configured to, if a PPPR value associated with said data packet or with data comprised in said data packet indicates a high reliability, to re-transmit said data packet at least once on another sidelink resource pool of the sidelink resource pools of the wireless communication system, or on at least one other component carrier, wherein the transceiver
is served by a central transceiver of the wireless communication system, wherein the transceiver is configured to operate in LTE V2X mode 3, NR V2X mode 1 or D2D mode 1 in which scheduling of resources for the communication with the at least one other transceiver is performed by the central transceiver, or is configured to operate in LTE V2X mode 4, NR V2X mode 2 or D2D mode 2, wherein the transceiver is configured to schedule resources for the sidelink communication autonomously.

17. The transceiver according to claim 16, wherein the transceiver is configured to retransmit said data packet at least once, if the PPPR value indicates a reliability that is equal to or higher than a predefined reliability or threshold.

18. A non-transitory digital storage medium having stored thereon a computer program for performing a method for transmitting data packets in a wireless communication system between at least two transceivers communicating with each other using sidelink resource pools of the wireless communication system, the method comprising:

transmitting a data packet on one of the sidelink resource pools of the wireless communication system to the other transceiver of the wireless communication system; and re-transmitting said data packet at least once on another sidelink resource pool of the sidelink resource pools of the wireless communication system, if a PPPR value associated with said data packet or with data comprised in said data packet indicates a high reliability,
wherein the transceiver
   is served by a central transceiver of the wireless communication system, wherein the transceiver is operated in LTE V2X mode 3, NR V2X mode 1 or D2D mode 1 in which scheduling of resources for the communication with the at least one other transceiver is performed by the central transceiver,
   or is operated in V2X Mode 4, NR V2X mode 2 or D2D mode 2, in which the transceiver schedules resources for the sidelink communication autonomously,
when said computer program is run by a computer.

19. A non-transitory digital storage medium having stored thereon a computer program for performing a method for transmitting data packets in a wireless communication system between at least two transceivers communicating with each other using sidelink resource pools of the wireless communication system, the method comprising:

transmitting a data packet on one of the sidelink resource pools of the wireless communication system from one transceiver to the other transceiver of the wireless communication system; and re-transmitting said data packet, if a PPPR value associated with said data packet or with data comprised in said data packet indicates a high reliability, at least once on another sidelink resource pool of the sidelink resource pools of the wireless communication system,
or on at least one other component carrier,
wherein the transceiver
   is served by a central transceiver of the wireless communication system, wherein the transceiver is operated in LTE V2X mode 3, NR V2X mode 1 or D2D mode 1 in which scheduling of resources for the communication with the at least one other transceiver is performed by the central transceiver,
   or is operated in V2X Mode 4, NR V2X mode 2 or D2D mode 2, in which the transceiver schedules resources for the sidelink communication autonomously,
when said computer program is run by a computer.

* * * * *